Patented Nov. 28, 1922.

1,437,344

UNITED STATES PATENT OFFICE.

CHAUNCEY C. LOOMIS, OF NEW YORK, N. Y., ASSIGNOR TO SEMET-SOLVAY COMPANY, OF SOLVAY, NEW YORK, A CORPORATION OF NEW YORK.

PROCESS OF PREPARING COUMARIN.

No Drawing.   Application filed June 23, 1921. Serial No. 479,810.

*To all whom it may concern:*

Be it known that I, CHAUNCEY C. LOOMIS, a citizen of the United States, residing in the city of New York, in the county and State of New York, have invented certain new and useful Improvements in Processes of Preparing Coumarin, of which the following is a specification.

In the process of preparing coumarin by heating together salicylic aldehyde, sodium acetate, and acetic anhydride as heretofore practiced the reaction product is associated with various impurities which have been with great difficulty, or not at all, separated from the coumarin.

The object of my improvements is to effect the separation of these impurities from the reaction product so as to produce the coumarin more readily and in a purer state than heretofore.

In carrying my invention into effect, I first effect the reaction as heretofore by heating a mixture of salicylic aldehyde, sodium acetate and acetic anhydride in the usual proportions and in any usual or suitable manner. When the reaction is complete the resulting mixture is then poured into a freshly prepared solution of milk of lime in excess and heated for a short time so as to hydrolize any acetyl derivatives present and convert acetic acid and unchanged acetic anhydride into calcium acetate. The coumarin goes into solution as a calcium salt without splitting the ring to form the calcium salt of coumarin.

The solution is then filtered hot and the filter cake, mostly unchanged lime, is washed with hot water to recover any adhering product. The solution should then be concentrated to a suitable volume and is acidified with a suitable acid as, hydrochloric acid, whereupon the coumarin separates as an oil and at once solidifies and is then separated from the reaction mixture. It can now, if desired, be obtained in very pure condition by vacuum distillation and crystallization.

What I claim as new and desire to secure by Letters Patent is:—

1. The improvement in the process of preparing coumarin which consists in mixing the reaction mixture obtained by heating together salicylic aldehyde, sodium acetate and acetic anhydride with milk of lime and heating the mixture, filtering the mixture and treating the filtrate with acid and finally separating out the coumarin.

2. The improvement in the process of preparing coumarin which consists in treating the reaction mixture obtained by heating together salicylic aldehyde, sodium acetate and acetic anhydride, with milk of lime so as to hydrolize any acetyl derivatives present and convert acetic acid and unchanged acetic anhydride into calcium acetate and form a calcium salt of coumarin and setting free the coumarin by acidification.

In testimony whereof I affix my signature, this 22d day of June, 1921.

CHAUNCEY C. LOOMIS.